US008327326B2

(12) United States Patent
Campbell et al.

(10) Patent No.: US 8,327,326 B2
(45) Date of Patent: Dec. 4, 2012

(54) INSERTING CLOSING CODE CONSTRUCTS

(75) Inventors: Dustin Campbell, Bellevue, WA (US); Deum Jik Park, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 387 days.

(21) Appl. No.: 12/815,838

(22) Filed: Jun. 15, 2010

(65) Prior Publication Data

US 2011/0307861 A1    Dec. 15, 2011

(51) Int. Cl.
G06F 9/44    (2006.01)
(52) U.S. Cl. ...................................... 717/112
(58) Field of Classification Search .................. 717/112; 358/1.18; 704/2, 243; 706/11; 455/550.1; 341/22; 380/201
See application file for complete search history.

(56) References Cited

U.S. PATENT DOCUMENTS

| 7,127,704 | B2 | 10/2006 | Van De Vanter |
| 7,562,344 | B1 | 7/2009 | Allen |
| 2005/0114771 | A1 | 5/2005 | Piehler |
| 2006/0241933 | A1* | 10/2006 | Franz .............................. 704/2 |
| 2009/0077534 | A1 | 3/2009 | Peterson |
| 2009/0109067 | A1* | 4/2009 | Burstrom ....................... 341/22 |
| 2009/0216690 | A1* | 8/2009 | Badger et al. ................... 706/11 |

OTHER PUBLICATIONS

Sun Microsystems, "TextField" (MID Profile), javax, Copyright 2006, pp. 1-18, <TextField_2006.pdf>.*
De Jonge, Maartje, et al., "Natural and Flexible Error Recovery for Generated Parsers", Delft University of Technology Software Engineering Research Group Technical Report Series, Oct. 2009, 23 pages.
Baier, Jochen, "Automatic highlighting of matching braces for Visual Studio C++", Nov. 5, 2008, 4 pages.
Alves, Thiago, "AutoClose: Auto close pair of characters", Based on information and belief available, at least as early as Apr. 9, 2010, 3 pages.
Tichy, Gabriel, User Interface Specification: "Smart Brackets", Based on information and belief available, at least as early as Apr. 9, 2010, 2 pages.

* cited by examiner

Primary Examiner — Tuan A Vu
(74) Attorney, Agent, or Firm — Workman Nydegger

(57) ABSTRACT

The present invention extends to methods, systems, and computer program products for inserting closing code constructs. Embodiments of the invention include an interaction model allowing users to more easily move closing code constructs to desired locations within text. For example, closing code constructs can be moved as if they were an editor caret. The interaction model can limit a user to selecting legal positions for a closing code construct. The limits can be based on the structure of existing code in combination with syntactical and/or semantic rules of the programming language being used to develop the existing code.

20 Claims, 6 Drawing Sheets

500

501
Receiving User Input From A User, The User Input For Entering An Opening Code Construct At A Specified Position Within A Portion Of Source Code, The Opening Code Construct In Combination With A Corresponding Closing Code Construct Representing A Specified Feature Of The Programming Language

In Response To Receiving The User Input For Entering The Opening Code Construct:

502
Visually Indicating Placement Of The Opening Code Construct At The Specified Position Within The Portion Of Source Code

503
Visually Indicating Placement Of The Corresponding Closing Code Construct At Another Position Within The Portion Of Source Code Based On Other Features Of The Programming Language

504
Detecting That The User's Intent With Respect To Placement Of The Corresponding Closing Construct Is Ambiguous Based On The Specified Position Of The Opening Construct And The Specified Feature Of The Programming Language

505
In Response To The Detected Ambiguity, Transitioning The Editor To An Interaction Mode For Positioning Closing Code Constructs, The Interaction Mode Indicating That The User Is Permitted To Reposition The Closing Construct Between One Or More Valid Positions Within The Portion Of Source Code In Accordance With Further Features Of The Programming Language, The Interaction Mode Altering How One Or More Forms Of User Input Are Interpreted By The Editor

*Figure 5*

INSERTING CLOSING CODE CONSTRUCTS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Typically, to generate an application, a developer writes source code in a programming language, such as, for example, C#, Visual Basic ("VB"), etc. and then compiles the source code into an executable. Developers often use a code editor, such as, for example, an Integrated Development Environment ("IDE") to assist with writing source code. Many code editors provide convenience features to automate portions of the code development process. For example, code editors can use color coding to distinguish between different types of programming constructs.

Many code editors also use various forms of auto-completion to assist in code entry. Auto-completion can be used to complete words, match corresponding programming constructs, etc. Some code editors automatically entered a closing construct in response to detecting an opening construct. For example, when typing an open parenthesis, '(', the closing parenthesis, ')', can automatically be inserted.

While such features work well when typing code for the first time, they become difficult to use when code that is already written. Consider the following existing code, written in C#:

int x=1+2;

If the user places the editor caret immediately before the "1" and types an open parenthesis, '(', the editor will have difficulty in determining an appropriate location for the closing parenthesis ')'. The user's intent is ambiguous. The user may intend to apply a type-cast, the completing the closing parenthesis is preferred:

int x=(byte)1+2;

However, if the user wishes to enclose the expression in parentheses, automatically inserting the closing parenthesis would simply get in the user's way.

int x=(1+1);

BRIEF SUMMARY

The present invention extends to methods, systems, and computer program products for inserting closing code constructs. User input is received from a user. The user input is for entering an opening code construct at a specified position within a portion of source code. The opening code construct in combination with a corresponding closing code construct represents a specified feature of the programming language.

In response to receiving the user input for entering the opening code construct, placement of the opening code construct is visually indicated at the specified position within the portion of source code. Also in response to receiving the user input placement of the corresponding closing code construct is indicated at another position within the portion of source code. Placement of the closing code construct is based on other features of the programming language.

It is detected that the user's intent with respect to placement of the corresponding closing construct. The ambiguity is based on the specified position of the opening construct and the specified feature of the programming language. In response to the detected ambiguity, the editor is transitioned into an interaction mode for positioning closing code constructs. The interaction mode indicates that the user is permitted to reposition the closing construct between one or more valid positions within the portion of source code in accordance with further features of the programming language. The interaction mode alters how one or more forms of user input are interpreted by the editor.

A form of user input is received from the user. The form of input is selected from among one or more forms of input available to the user. The closing code construct is repositioned in accordance with the altered interpretation of the received form of user input due to the editor being in the interaction mode. Transitioning the editor out of the interaction mode subsequent to re-positioning the closing code construct.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
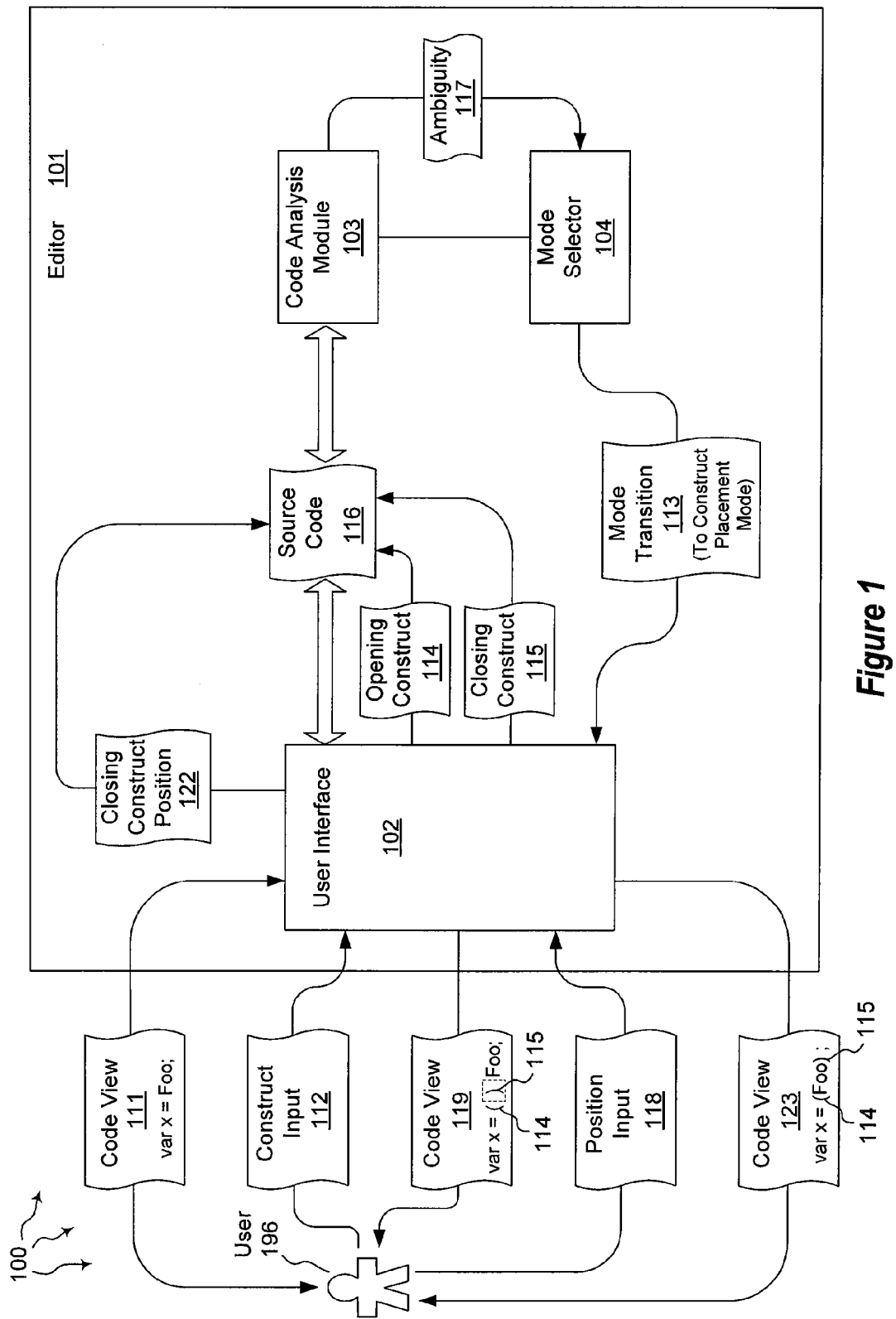
FIG. 1 illustrates an example computer architecture that facilitates inserting closing code constructs.

The present invention extends to methods, systems, and computer program products for inserting closing code constructs. User input is received from a user. The user input is for entering an opening code construct at a specified position within a portion of source code. The opening code construct in combination with a corresponding closing code construct represents a specified feature of the programming language.

In response to receiving the user input for entering the opening code construct, placement of the opening code construct is visually indicated at the specified position within the portion of source code. Also in response to receiving the user input placement of the corresponding closing code construct is indicated at another position within the portion of source code. Placement of the closing code construct is based on other features of the programming language.

It is detected that the user's intent with respect to placement of the corresponding closing construct. The ambiguity is based on the specified position of the opening construct and the specified feature of the programming language. In response to the detected ambiguity, the editor is transitioned into an interaction mode for positioning closing code constructs. The interaction mode indicates that the user is permitted to reposition the closing construct between one or more valid positions within the portion of source code in accordance with further features of the programming language. The interaction mode alters how one or more forms of user input are interpreted by the editor.

A form of user input is received from the user. The form of input is selected from among one or more forms of input available to the user. The closing code construct is repositioned in accordance with the altered interpretation of the received form of user input due to the editor being in the interaction mode. Transitioning the editor out of the interaction mode subsequent to re-positioning the closing code construct.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention include an interaction model allowing users to more easily move closing code constructs to desired locations within text. For example, closing code constructs can be moved as if they were an editor caret. The interaction model can limit a user to selecting legal positions for a closing code construct. The limits can be based on the structure of existing code in combination with syntactical and/or semantic rules of the programming language being used to develop the existing code.

FIG. 1 illustrates an example computer architecture 100 that facilitates inserting closing code constructs. Referring to FIG. 1, computer architecture 100 includes user 196 and editor 101. Editor 101 further includes user interface 102, code analysis module 103, and editor mode selector 104. Each of the depicted components is connected to one another over (or is part of) a network, such as, for example, a Local Area Network ("LAN"), a Wide Area Network ("WAN"), and even the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Generally, user 196 submits input to editor 101 to enter programming language code (e.g., C#, Visual Basic ("VB"), eXtensible Markup Language ("XML"), etc.). Input to editor 101 can include opening code constructs. User-interface 102 reflects a code view of entered programming language code as the programming language code is edited.

Code analysis module 103 is configured to detect ambiguity in a user's intent with respect to the placement of a closing code construct. When ambiguity is detected, mode selector 104 transitions editor 101 into an interaction mode for positioning closing constructs. The interaction mode can indicate that the user is permitted to reposition a closing code construct between one or more valid positions. The one or more valid positions can be selected based on features (e.g., syntactical and/or semantic rules) of a programming language. The one or more valid positions can be visually indicated at user interface 102.

When editor 101 is in the interaction mode, the editor 101 can alter how one or more forms of user input are interpreted. For example, user input selecting an arrow key can cause the position of a closing code construct (possibly along with an editor caret) to move to a next valid position (instead of the editor caret moving a single space). When a closing code construct is moved to the desired valid position, a user can enter further input to select the desired valid position. In response, the closing code construct is visually indicated at the desired valid position. After (re)positioning a closing code construct, mode selected 104 transition editor 101 out of the interaction mode.

Figure 5:
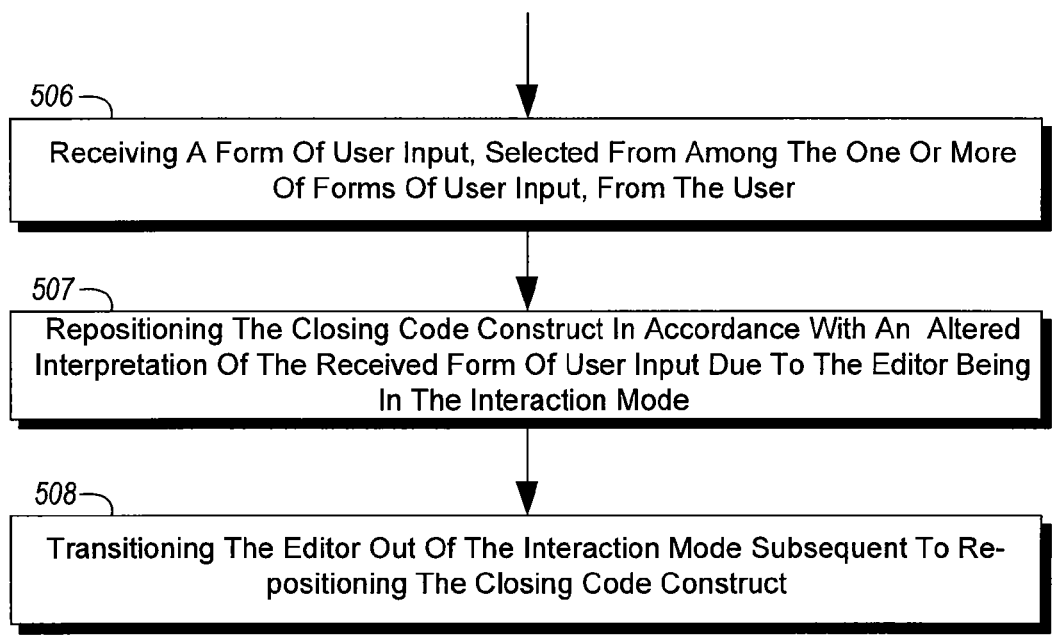
FIG. 5 illustrates a flow chart of an example method for inserting closing code constructs.

FIG. 5 illustrates a flow chart of an example method 500 for inserting a closing code construct. Method 500 will be described with respect to the components and data of computer architecture 100.

Method 500 includes an act of receiving user input from a user, the user input for entering an opening code construct at a specified position within a portion of source code, the opening code construct in combination with a corresponding closing code construct representing a specified feature of the programming language (act 501). For example, user 196 can be interacting with code view 111 (of source code 116) through user-interface 102. User 196 can submit construct input 112 to editor 101. User interface 102 can receive construct input 112. Construct input 112 can be input for entering opening code construct 114 at a specified position within source code 116. Opening code construct 114 in combination with closing code construct 115 represent a grouping feature of the programming language used to develop source code 116.

Method 500 includes in response to receiving the user input for entering the opening code construct, an act of visually indicating placement of the opening code construct at the specified position within the portion of source code (act 502) and an act of visually indicating placement of the corresponding closing code construct at another position within the portion of source code based on other features of the programming language (act 503). For example, user-interface 102 can output code view 119 (of source code 116). Code view 119 visually indicates the placement of opening code construct 114 and closing code construct 115 within source code 116. The placement of closing code construct 115 can be based on other features, such as, for example, other syntactical and/or semantic rules, of the programming language used to develop source code 116.

Method 500 includes an act of detecting that the user's intent with respect to placement of the corresponding closing construct is ambiguous based on the specified position of the opening construct and the specified feature of the programming language (act 504). For example, code analysis module 103 can analyze source code 116 and detect ambiguity 117. Ambiguity 117 represents user 196's intent with respect to placement of closing construct 115 is ambiguous. That is, editor 101 has no way to know if closing code construct 115 is to be placed after the 'F', the after first 'o', after the second 'o', or even at some other location in source code 116. Code analysis module 103 can sent ambiguity 117 to mode selector 104

In response to the detected ambiguity, method 500 includes an act of the processor transitioning the editor to an interaction mode for positioning closing code constructs, the interaction mode indicating that the user is permitted to reposition the closing construct between one or more valid positions within the portion of source code in accordance with further features of the programming language, the interaction mode altering how one or more forms of user input are interpreted by the editor (act 505). For example, mode selector 104 can receive ambiguity 117 from code analysis module 103. In response to ambiguity 117, model selector can send mode transition 113 to transition editor 101 to construct placement mode for placing close code constructs. In construct placement mode, user 196 is permitted to reposition closing code construct 115 in accordance with further features, such as, for example, further syntactical and/or semantic rules, of the programming language used to develop source code 116.

Visual indicators (e.g., a dashed box around a closing code construct) can be presented within a code view to indicate when editor 101 is in construct placement mode.

Method 500 includes an act of receiving a form of user input, selected from among the one or more of forms of user input, from the user (act 506). For example, in response to code view 119, user 196 can enter position input 118 from a keyboard. Position input 118 can be input (e.g., three right arrow keys) for repositioning closing code construct 115. Alternately, mouse based and other types of user input can also be entered and received.

Method 500 includes an act of repositioning the closing code construct in accordance with an altered interpretation of the received form of user input due to the editor being in the interaction mode (act 507). For example, when in construct placement mode, editor 101 can interpret keyboard based movement input as moving closing code construct 115 (e.g., instead of an editor caret). Thus, in response to receiving position input 118, editor 101 can reposition closing code construct 115 at closing construct position 122 or after the second 'o' (i.e., three spaces to the right from its previous position) within source code 116. User-interface 102 can output code view 123 (of source code 116) after closing code construct 115 is moved. As depicted in code view 123, closing code construct 115 is now positioned after the second 'o'. Closing code constructs can also be repositioned in response to mouse based and other types of user input.

Method 500 includes an act of transitioning the editor out of the interaction mode subsequent to re-positioning the closing code construct (act 508). For example, when closing code construct 115 is in the desired position, user 196 can enter additional user input indicating that the position is correct of closing code construct 115 is correct. In response to this additional user input, editor 101 can transition out of construct placement mode.

Figure 2:
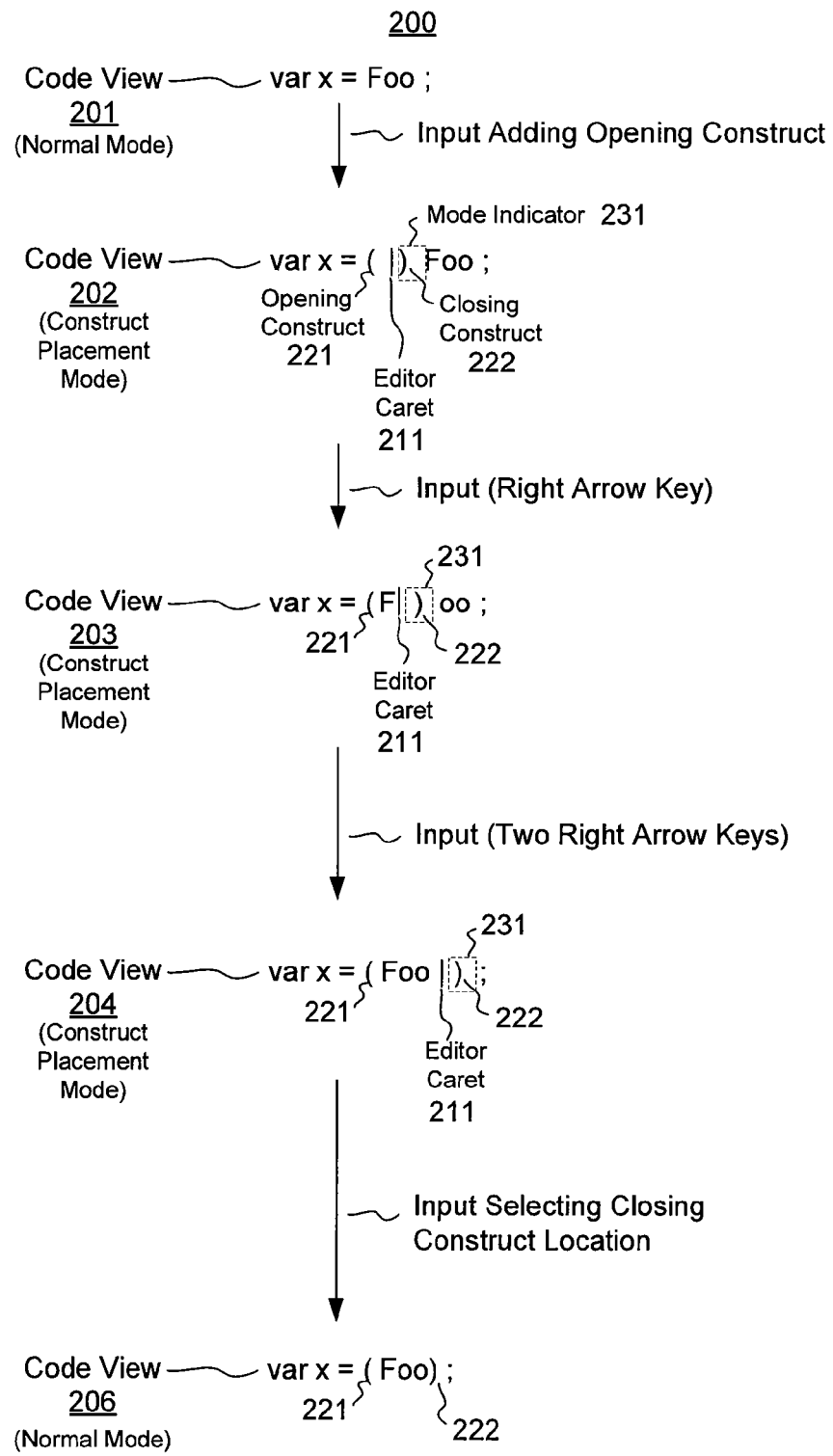
FIG. 2 illustrates an example data flow for moving a closing construct along with an editor caret.

In some embodiments, altering the interpretation of user input can include "sticking" a closing code construct to an editor caret. Accordingly, the closing code construct moves along with the editor caret in response to user input. FIG. 2 illustrates an example data flow 200 for moving a closing construct along with an editor caret.

An editor can present code view 201 (e.g., when in a normal editor mode). User entered input adding an opening construct is received. In response, the editor transitions to construct placement mode and presents code view 202. Code view 202 includes opening construct 221, editor caret 211, and closing construct 222. Code view 202 is ambiguous with respect to the user's intent for the location of closing code construct. There is any number of syntactically correct locations where closing construct 222 can be positioned.

For example, the user may wish to insert a type cast. As such, the user can begin typing between opening construct 221 and closing construct 222. Alternately, the user may wish to enclose "Foo" within parentheses.

Mode indicator 231 indicates that the editor is in a construct placement mode (or other mode that alters the interpretation of user input). When in construct placement mode, the editor alters the interpretation of user input to apply to both editor caret 211 and closing code construct 222. That is, closing construct 222 "sticks" to editor caret 211. Accordingly, user input for moving editor caret 211 results in both editor caret 211 and closing code construct 222 moving together in accordance with the user input.

Subsequently, user input indicating selection of a right arrow key is received. In response, the editor presents code view 203. As depicted, both editor caret 111 and closing code construct 222 are moved one space to the right (to a position to the right of the 'F'). Subsequently, user entered input indicating selection of a two right arrow keys is received. In response, the editor presents code view 204. As depicted, both editor caret 111 and closing code construct 222 are moved two more spaces to the right (to a position to the right of the second 'o'). Subsequently, user input selecting the location of closing code construct 222 as correct is received. In response, the editor transitions back to normal mode and presents code view 226.

Figure 3:
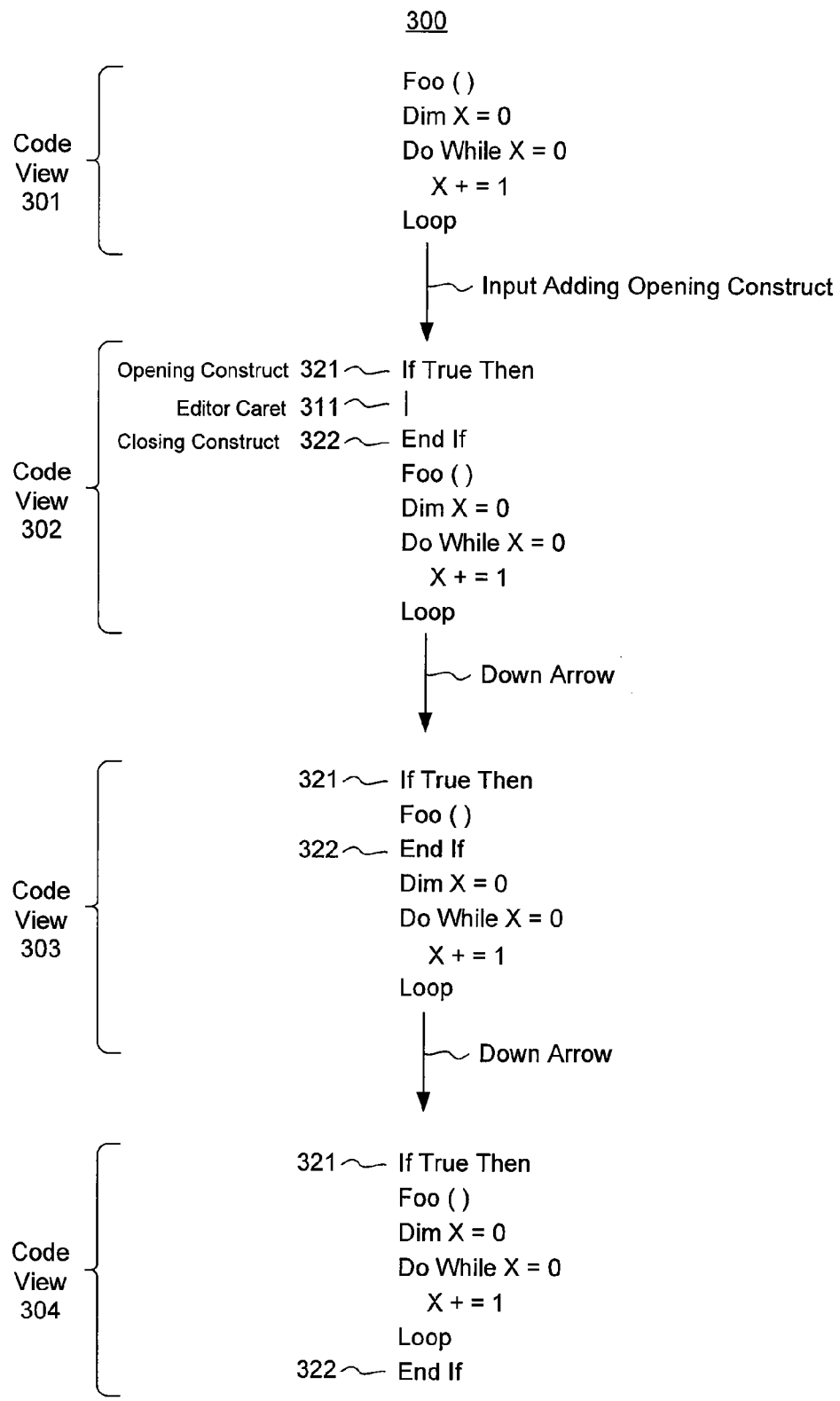
FIG. 3 illustrates an example data flow for moving a closing construct between positions.

In other embodiments, altering the interpretation of user input can include moving a closing code construct between permitted locations. This mitigates the possibility of placing a closing code construct in a location that violates syntactic and/or semantic rules of a programming language. FIG. 3 illustrates an example data flow 300 for moving a closing construct between positions.

An editor can present code view 301 (e.g., when in a normal editor mode). User entered input adding an opening construct is received. In response, the editor transitions to construct placement mode and presents code view 302. Code view 302 includes opening construct 321, editor caret 311, and closing construct 322. Code view is ambiguous with respect to the correct location for closing construct 322. The user may desire to type between open construct 321 and closing construct 322. Alternately, the user may desire to move closing code construct 322 to encompass other portions of code view 302.

When in construct placement mode, the editor alters the interpretation of user input to limit the movement closing code construct 322 to semantically legal positions. Thus, single key user input moving up and down (e.g., a single selection of an arrow key) can cause closing code construct 322 to move up or down multiple lines of code.

Subsequently, user input indicating selection of a down arrow key is received. In response, the editor presents code view 303. As depicted, closing code construct 322 is moved below the line "Foo( )". Subsequently, user input indicating selection of a down arrow key is again received. In response, the editor presents code view 304. As depicted, closing code construct 322 is moved below the line "Loop". Moving closing code construct 322 to other intermediate locations is not permitted based on the semantics of the programming language. For example, positioning close code construct 322 after "Dim x=0" would remove the variable 'x' from scope, but variable 'x' is used in the "Do While x=0" expression.

Figure 4:
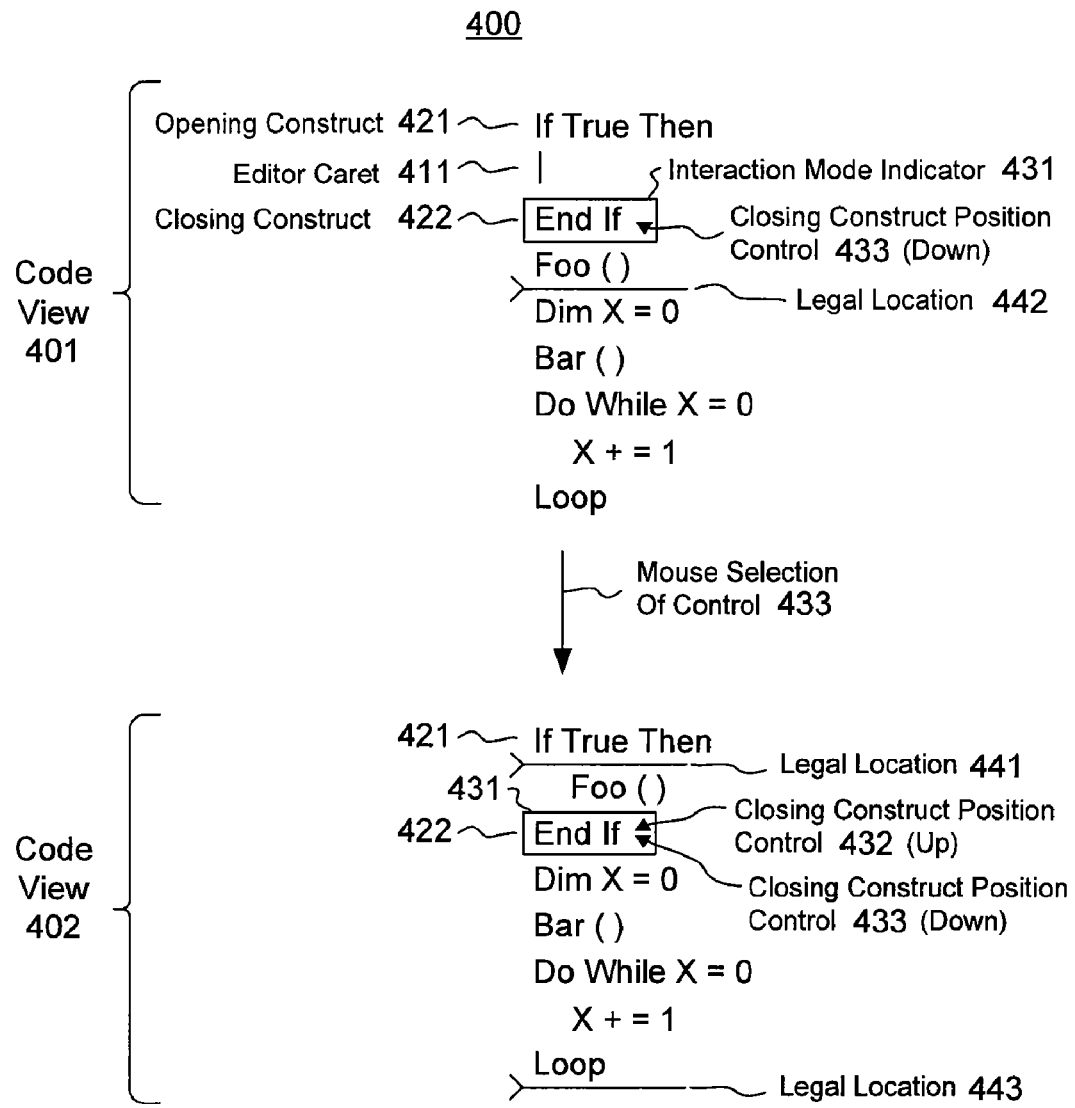
FIG. 4 illustrates an example data flow for moving a closing construct between positions and visually indicating positions.

In other embodiments, altering the interpretation of user input can include visual indicating permitted locations. This permits a user to know (e.g., semantically) legal positions for a closing code construct prior to moving the closing code construct. FIG. 4 illustrates an example data flow 400 for moving a closing construct between positions and visually indicating positions.

An editor can present code view 401. As depicted, code view 401 includes opening construct 421, editor caret 411, and closing construct 422. Interaction mode indicator 431 indicates to a user that the editor is in construct placement mode. Legal position 442 indicates a next (e.g., semantically) legal position for closing construct 422. Closing construct position control 433 can be selected (e.g., with a mouse) to move closing construct 422 to legal location 442.

Subsequently, user input selecting construct position control 433 is received. In response, the editor presents code view 402. As depicted, closing code construct is repositioned at legal location 442. Legal locations 441 and 443 indicate next (e.g., semantically legal) locations for closing construct 422. Closing construct position control 432 can be selected (e.g., with a mouse) to move closing construct 422 back to legal location 441. Closing construct position control 433 can be selected (e.g., with a mouse) to move closing construct 422 to legal location 443.

Thus, a user can move closing code construct 422 within the code views having knowledge of the next legal position.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, the computer system also including an editor for editing source code of a programming language, a method for providing automated assistance to resolve the placement of a closing code construct operative as an editor caret when editing a portion of source code, the method comprising:

while the editor is in a non-interaction mode for positioning closing code constructs:
   an act of receiving user input from a user, the user input for entering an opening code construct at a specified position within the portion of source code, wherein the opening code construct in combination with a corresponding closing code construct form a grouping representing a feature of the programming language that is being used to develop the source code;
   in response to receiving the user input for entering the opening code construct:
      an act of visually indicating placement of the opening code construct at the specified position within the portion of source code; and
      an act of visually indicating placement of the corresponding closing code construct at another position within the portion of source code based on one or more syntactical rules or semantic rules of the programming language; and
   an act of detecting that the user's intent with respect to placement of the corresponding closing construct is ambiguous, the ambiguous placement being a real-time event identified as a mismatch between the predicted placement for the closing construct and the user's actual placement of the closing construct in view of the user's earlier placement of the opening construct, the mismatch based on observance of the syntactical and semantic rules of the programming language;
   in response to the ambiguous placement, an act of the processor transitioning the editor to an interaction mode for positioning closing code constructs, the interaction mode visually indicating that the user is permitted to reposition the closing construct between one or more visually indicated valid positions within the portion of source code, the visual indication of one or more valid positions in accordance with the one or more syntactical rules or semantic rules of the programming language, the interaction mode altering how one or more forms of user input are interpreted by the editor;
   an act of receiving a form of user input, selected from among the one or more of forms of user input, from the user;
   an act of re-positioning the closing code construct in accordance with an altered interpretation of the received form of user input due to the editor being in the interaction mode; and
   an act of transitioning the editor out of the interaction mode subsequent to re-positioning the closing code construct.

2. The method as recited in claim 1, further comprising in response to detecting the ambiguity an act of highlighting the closing code construct to indicate the that user is permitted to move the closing code construct between the one or more valid positions.

3. The method as recited in claim 1, wherein the act of the transitioning the editor to an interaction mode for positioning closing code constructs comprises an act of transitioning to an interaction mode that permits repositioning of the closing construct based on syntactic rules of the programming language.

4. The method as recited in claim 1, wherein the act of the transitioning the editor to an interaction mode for positioning closing code constructs comprises an act of transitioning to an interaction mode that permits repositioning of the closing construct based on semantic rules of the programming language.

5. The method as recited in claim 1, wherein the act of transitioning the editor to an interaction mode for positioning closing code constructs comprises an act of linking the closing code construct to the cursor of the editor such that the closing code construct sticks to and moves along with the cursor in response to user input.

6. The method as recited in claim 5, wherein the act of receiving a form of user input comprises an act of receiving keyboard driven cursor movement; and
   wherein the act of re-positioning the closing code construct comprises an act of moving the closing code construct along with the cursor in response to the keyboard driven cursor movement.

7. The method as recited in claim 6, wherein the keyboard driven cursor movement comprises arrow key cursor movement.

8. The method as recited in claim 1, wherein the act of transitioning the editor to an interaction mode for positioning closing code constructs comprises an act of visually indicating the one or more valid positions within the editor.

9. The method as recited in claim 1, wherein the act of transitioning the editor to an interaction mode for positioning closing code constructs comprises an act of visually augmenting the closing code construct with one or more user-interface controls for moving the closing code construct between the one or more valid positions.

10. The method as recited in claim 9, wherein the act of receiving a form of user input comprises an act of receiving mouse driven input selecting a user-interface control from among the one or more user-interface controls; and
   wherein the act of re-positioning the closing code construct comprises an act of moving the closing code construct directly to a valid position, from among the one or more valid positions, in response to the mouse driven input.

11. The method as recited in claim 10, wherein an act of moving the closing code construct directly to a valid position comprises an act of skipping over one or more lines of text within the portion of source code to move the closing code construct from the other position directly to the valid position.

12. A computer program product for use at a computer system, the computer system including an editor for editing source code of a programming language, the computer program product for implementing a method for providing automated assistance to resolve the placement of a closing code construct operative as an editor caret when editing a portion of source code, the computer program product comprising one or more computer readable media having stored thereon computer-executable instructions that, when executed at a processor, cause the computer system to perform the method, including the following:
   while the editor is in a non-interaction mode for positioning closing code constructs:
      receive user input from a user, the user input for entering an opening code construct at a specified position within the portion of source code, wherein the opening code construct in combination with a corresponding closing code construct form a grouping representing a feature of the programming language that is being used to develop the source code;
      in response to receiving the user input for entering the opening code construct:
         visually indicate placement of the opening code construct at the specified position within the portion of source code; and
         visually indicate placement of the corresponding closing code construct at another position within the portion of source code based on one or more syntactical rules or semantic rules of the programming language; and detect that the user's intent with respect to placement of the corresponding closing construct is ambiguous, the ambiguous placement being a real-time event identified as a mismatch between the predicted placement for the closing construct and the user's actual placement of the closing construct in view of the user's earlier placement of the opening construct, the mismatch based on observance of the syntactical and semantic rules of the programming language;

in response to the ambiguous placement, transition the editor to an interaction mode for positioning closing code constructs, the interaction mode visually indicating that the user is permitted to reposition the closing construct between one or more visually indicated valid positions within the portion of source code, the visual indication of one or more valid positions in accordance with the one or more syntactical rules or semantic rules of the programming language, the interaction mode altering how one or more forms of user input are interpreted by the editor;

receive a form of user input, selected from among the one or more of forms of user input, from the user;

re-position the closing code construct in accordance with an altered interpretation of the received form of user input due to the editor being in the interaction mode; and transition the editor out of the interaction mode subsequent to re-positioning the closing code construct.

13. The computer-program product as recited in claim 12, further comprising computer-executable instructions that, when executed, cause the computer system to highlight the closing code construct to indicate the that user is permitted to move the closing code construct between the one or more valid positions in response to detecting the ambiguity.

14. The computer-program product as recited in claim 12, wherein computer-executable instructions that, when executed, cause the computer system to transition the editor to transition to an interaction mode for positioning closing code constructs comprise computer-executable instructions that, when executed, cause the computer system to transition to an interaction mode that permits repositioning of the closing construct based on syntactic rules of the programming language.

15. The computer-program product as recited in claim 12, wherein computer-executable instructions that, when executed, cause the computer system to transition the editor to transition to an interaction mode for positioning closing code constructs comprise computer-executable instructions that, when executed, cause the computer system to transition to an interaction mode that permits repositioning of the closing construct based on semantic rules of the programming language.

16. The computer-program product as recited in claim 12, wherein computer-executable instructions that, when executed, cause the computer system to transition the editor to an interaction mode for positioning closing code constructs comprise computer-executable instructions that, when executed, cause the computer system to link the closing code construct to the cursor of the editor such that the closing code construct sticks to and moves along with the cursor in response to user input.

17. The computer-program product as recited in claim 12, wherein computer-executable instructions that, when executed, cause the computer system to transition the editor to an interaction mode for positioning closing code constructs comprise computer-executable instructions that, when executed, cause the computer system to visually indicate the one or more valid positions within the editor.

18. The computer-program product as recited in claim 12, wherein computer-executable instructions that, when executed, cause the computer system to transition the editor to an interaction mode for positioning closing code constructs comprise computer-executable instructions that, when executed, cause the computer system to visually augment the closing code construct with one or more user-interface controls for moving the closing code construct between the one or more valid positions.

19. The computer-program product as recited in claim 12, wherein computer-executable instructions that, when executed, cause the computer system to re-position the closing code construct in accordance with an altered interpretation of the received form of user input due to the editor being in the interaction mode comprise computer-executable instructions that, when executed, cause the computer system to skip over one or more lines of text within the portion of source code to move the closing code construct to a legal position.

20. A computer system comprising:
one or more processors;
system memory; and
one or more computer readable media having stored thereon executable instructions representing an editor, the editor including a user-interface, a code analysis module, and a mode selector, wherein the editor is configured to:
while the editor is in a non-interaction mode for positioning closing code constructs:
receive user input from a user, the user input for entering an opening code construct at a specified position within the portion of source code, wherein the opening code construct in combination with a corresponding closing code construct form a grouping representing a feature of the programming language that is being used to develop the source code;
in response to receiving the user input for entering the opening code construct:
visually indicate placement of the opening code construct at the specified position within the portion of source code; and
visually indicate placement of the corresponding closing code construct operative as an editor caret at another position within the portion of source code based on one or more syntactical rules or semantic rules of the programming language; and
detect that the user's intent with respect to placement of the corresponding closing construct is ambiguous, the ambiguous placement being a real-time event identified as a mismatch between the predicted placement for the closing construct and the user's actual placement of the closing construct in view of the user's earlier placement of the opening construct the mismatch based on observance of the syntactical and semantic rules of the programming language;

in response to the ambiguous placement, transition the editor to an interaction mode for positioning closing code constructs, the interaction mode visually indicating that the user is permitted to reposition the closing construct between one or more visually indicated valid positions within the portion of source code, the visual indication of one or more valid positions in accordance with the one or more syntactical rules or semantic rules of the programming language, the interaction mode altering how one or more forms of user input are interpreted by the editor;

receive a form of user input, selected from among the one or more of forms of user input, from the user;

re-position the closing code construct in accordance with an altered interpretation of the received form of user input due to the editor being in the interaction mode; and transition the editor out of the interaction mode subsequent to re-positioning the closing code construct.

* * * * *